United States Patent [19]
Rubert

[11] 3,744,304
[45] July 10, 1973

[54] ASSESSMENT OF ROUGHNESS

[76] Inventor: Myron Peter Rubert, Fernhill Woodbrook Road., Alderley Edge, Cheshire, England

[22] Filed: May 20, 1971

[21] Appl. No.: 145,318

[30] Foreign Application Priority Data
May 26, 1970 Great Britain.................. 25,115/70

[52] U.S. Cl. ............................................. 73/105
[51] Int. Cl. ........................................... G01b 5/23
[58] Field of Search.............................. 73/104, 105

[56] References Cited
UNITED STATES PATENTS
3,019,639  2/1962  Staples................................... 73/105
3,414,127  12/1968  Sorbie.............................. 73/105 X FOREIGN PATENTS OR APPLICATIONS
1,103,428  2/1968  Great Britain........................ 73/105

Primary Examiner—Richard C. Queisser
Assistant Examiner—John P. Beauchamp
Attorney—Salter & Michaelson

[57] ABSTRACT

An instrument for assessing roughness of a surface having a probe arranged to engage the surface and be urged towards the surface in the direction of the probe which is arranged to yield when the probe is at a critical angle to the surface dependent on the surface roughness.

12 Claims, 1 Drawing Figure

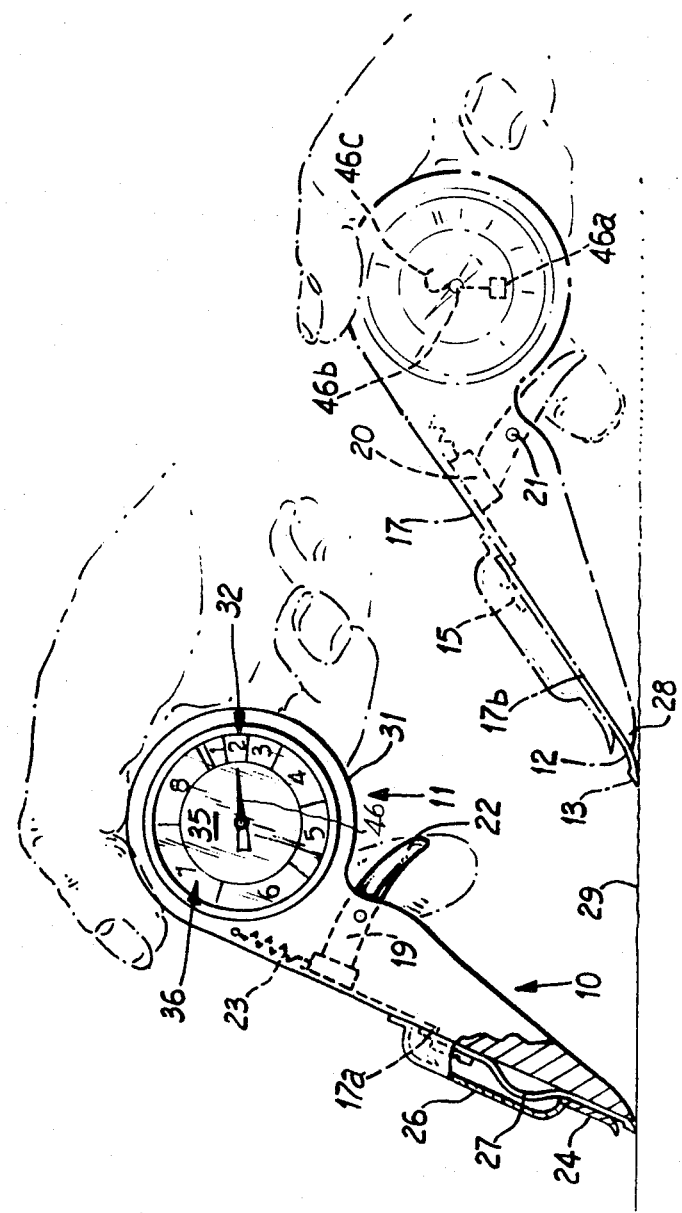

ASSESSMENT OF ROUGHNESS

This invention relates to the assessment of roug ness, for example on a machined or other surface, or on a cutting edge, it being understood that the irregularities producing the roughness may be localized or distributed throughout the surface.

According to the invention, an instrument for assessing roughness comprises a tracer probe, an end of the probe being disposable at an angle to a surface or edge whose roughness is to be assessed, and means for moving the probe at said angle from an inoperative to an operative position, the tracer probe being adapted to yield, on movement of the probe from its inoperative position to the operative position with the end engaging the surface or edge, when the end is at a critical angle of operation with respect to the surface or edge, which angle is a function of the degree of roughness of the surface or edge, and means for indicating the critical angle when the probe yields.

The probe may be in the form of a flat leaf spring arranged to buckle at the critical angle and biassed by spring means to its inoperative position.

The means for indicating the article angle may comprise a gravity controlled angle measuring device. One example may comprise a pointer over a scale, and in one arrangement the pointer is associated with a weight arranged to rotate the pointer over the scale as the probe is angularly moved relative to the surface or edge. Means may be provided for magnifying the movement of the pointer compared with the angular movement of the probe. For example there may be a gear connection between the weight and the pointer.

In another arrangement the angle measuring device comprises a spirit level, which may be curved. In a further arrangement the instrument incorporates a pointer pivotable in relation to a support over a scale.

Preferably the angle indicating means is adjustable to accommodate variations in the angular inclination of the surface or edge from a datum.

The instrument may be arranged to be hand-held and hand operated, for example it may be pistol-like, and have a trigger for moving the probe from the inoperative to the operative position.

The instrument may include a support for the probe and a protective cover arranged so that in use the support conveniently is placed against the surface or edge and the probe repeatedly extended and retracted whilst the angle is increased until yielding occurs.

The invention may be performed in various ways and one specific embodiment, with possible modifications, will now be described by way of example with reference to the accompanying drawing, which shows, partly in section, one instrument according to the invention in association with a surface under test.

Referring to the drawing a roughness measuring device is shown somewhat in the form of a pistol having a projecting support portion 10 and a substantially circular hand grip portion 11.

The upper surface of the support 10 is generally flat and is formed with a longitudinally extending groove 17b in which is slidable a flat probe 12. The probe is in the form of a spring blade made for example from spring steel strip about 0.025 mm. thick. The tip 13 of the blade is tipped with diamond or hard metal. For increased accuracy the operative front edge of the tip may be formed to a gradually increasing radius of curvature so that a flat test surface will be tangential thereto whatever the angle of attack of the probe in relation to the surface under test. For certain applications, such as the assessment of cutting edges as used for example in machine tools, razor blades or surgical knives, a preshaped moderately hard steel probe tip such as is convenient for general purpose use may be unsuitable owing to the high specific pressures encountered, in which case a hatchet-type or stylus-like tip of natural or synthetic diamond or like substance may be suitably attached to the blade, as mentioned above.

The inner end of the blade 12 nearer the hand grip portion 11 is formed with two spaced apertures and bolts 15 may extend through these apertures to secure the blade to a further flat member 17a which can slide beneath a cover plate 17 secured by screws to the upper surface of the probe carrier or support portion 10. This provides for easy removal and replacement of the blade.

The inner end of the flat member is secured to an end 20 of an arm 19 pivoted at 21 to the portion 10, the other end 22 of the arm 19 extending outwardly to form a trigger.

One end of a spring 23 is secured to the end 20 of the arm 19 and the other end of the spring is secured to the device so that the spring biasses the blade inwardly to a datum position. In the datum position the front or outer end 13 of the probe blade 12 is located between the support portion 10 and a flat front cover member 24 secured by screws to the upper surface of the support portion, the tip of the blade not extending outwardly of the tips of the support portion and the front cover plate. With this arrangement the blade tip is protected against damage when carried in a user's pocket or laid on a bench. A transparent plastics cover 26 is a push fit between the two cover plates 17 and 24 and provides a space above the blade into which the blade may bend or buckle as shown at 27.

In use, the tip 28 of the support portion 10 is placed against a horizontal surface whose roughness is to be assessed, such as the surface 29, and the trigger is operated to move the blade 12 outwardly against the force of the spring 23 to bring the tip 13 of the blade into engagement with the surface, as shown dotted. The trigger is then repeatedly operated to repeatedly move the blade forwardly whilst the angle between the surface under test and the blade is progressively increased by moving the instrument, for example from the chain dotted to the full line position, and say 1° or 2° between each successive operation. An angular position will be reached at which the blade will buckle, as indicated at 27, indicating that the forward or outward movement of the blade is being hindered by the roughness of the surface. The stroke of the blade is kept as small as possible. For extremely smooth surfaces the angle between the surface and the blade may approach 90° before the blade buckles. With rougher surfaces, the critical angle may be 20° or less.

The arrangement includes means to provide an assessment of the roughness. The hand grip is hollow with a rim 31. An angle indicating mechanism 32 is a push fit in the rim. The indicator includes a circular rear wall, a circumferential wall and a circular front wall. A spindle 46b extends axially of the rear wall and can rotate in bearings mounted on the rear wall. A pointer 46 is arranged outside the front wall and can move with the spindle, the pointer passing over a scale 36 on the outer surface of the front wall 35. A weight 46a is attached to the spindle so that as the angle of the instrument is increased the pointer moves over the scale.

The arrangement is such that with the blade 12 horizontal the pointer indicates zero on the scale. As the device is moved angularly with respect to the surface under test, the weight remains vertical, and acts on the pointer to rotate the pointer and thus move the pointer over the scale against the action of a spring 46c. The indicating device may include a magnifying arrangement so that the angular movement of the pointer is for example three times that of the instrument. One magnifying arrangement could be a gear mechanism between the weight and the pointer.

The device basically provides an indication of the arithmetical average of the deviation of the surface from a central line (CLA) through the deviations, and is primarily useful where the surface irregularities are substantially irregular, such as in a ground surface, as distinct from a surface in which the deviations are largely regular, such as turned or shaped surfaces.

The scale may be calibrated as shown to provide a real indication of a roughness parameter such as CLA or RA (arithmetical average of the depths of the irregularities) or the N-Groups according to the ISO recommendation, or may be used as a comparator. Alternatively, the scale may be calibrated in degrees so as to give an indication of the critical angle, from which the roughness may be determined by suitable conversion data.

The flexible blade behaves structurally and collapses or buckles when the tip touches the slopes of the surface irregularities at an angle of 90° or less, and the buckling results from the friction between the blade tip and the surface. The instrument evaluates the average slope of the irregularities, which is the main feature of friction coefficient, but the scale may be graduated directly in $\mu m$Ra because on irregular surfaces with no predominant sparings between irregularities (e.g., surfaces which are ground, honed, lapped, hand filed, emery-papered to about 4.5 $\mu m$Ra, or finer grade milled) the friction coefficient is nearly proportional to the Ra value. However this is not so on surfaces with regular spacings between irregularities (e.g., roughly turned surfaces). On regular surfaces the scale reading provides a comparison between surfaces but not an actual Ra value.

In practice, a number of readings would be taken, at different locations over an area, and an average taken. For example, 10 readings may be taken.

The scale is calibrated using a calibration surface whose roughness has been accurately measured by, and for example, an electronic roughness measuring instrument with a stylus.

In order to prevent damage to the indicator, the indicator mechanism may include means for holding the weight against swinging movement.

The device can be used on surfaces which are not horizontal, for example vertical, and the surface may be downwardly facing. In this case the indicator mechanism can be rotated within the rim 31 to bring the zero of the scale to a position appropriate to the inclination of the surface to the horizontal.

Other means may be used to provide an indication or measurement of the angle at which the blade begins to buckle on operation of the trigger. For example there may be provided a support for the object under test and an arcuate scale is fixed in relation to the support somewhat in the manner of a protractor. A pointer is pivotally mounted to the support and the device is connected to the pointer so that as the device is moved angularly with respect to the surface under test the pointer moves over the scale to provide an indication of the angle of the blade in relation to the surface.

In another arrangement the handgrip is arranged to accommodate a curved spirit level having a relatively small radius of curvature so that as the device is rotated the bubble in the spirit level moves angularly. An arcuate scale is associated with the level to provide the desired reading.

I claim:

1. An instrument for assessing roughness comprising a tracer probe, an end of the probe being disposable at an angle to a surface or edge whose roughness is to be assessed, and means for moving the probe at said angle from an inoperative to an operative position, the tracer probe being adapted to buckle, on movement of the probe from its inoperative position to the operative position with the end engaging the surface or edge, when the end is at a critical angle of operation with respect to the surface or edge, which angle is a function of the degree of roughness of the surface or edge, and two members carried by said instrument and movable relative to each other, the relative position of the two members being automatically determined by said angle.

2. An instrument as claimed in claim 1, in which the probe comprises a flat leaf spring arranged to buckle at the critical angle, and spring means biassing the probe to the inoperative position.

3. An instrument as claimed in claim 1, in which said two members form part of a gravity controlled angle measuring device.

4. An instrument as claimed in claim 3, in which the angle measuring device comprises a pointer movable over a scale.

5. An instrument as claimed in claim 3, in which the pointer is operatively connected to a weight arranged to rotate the pointer over the scale as the probe is angularly moved relative to the surface or edge.

6. An instrument as claimed in claim 1, in which the probe is arranged to slide in a support, a protective cover for the probe end mounted on the support.

7. An instrument as claimed claim 1, arranged to be hand-held and hand-operated.

8. An instrument as claimed in claim 7, comprising a hand grip.

9. An instrument as claimed in claim 8, in which said two members are housed in the hand grip.

10. An instrument as claimed in claim 7, and which is of pistol-like shape and has a trigger for moving the probe from the inoperative to the operative position.

11. An instrument as claimed in claim 1, in which said two members are angularly adjustable as a unit in relation to the probe.

12. An instrument as claimed in claim 9, in which said two members are angularly adjustable as a unit in the land grip.

* * * * *